March 26, 1940.    J. H. NEU    2,194,670
SALES TICKET
Filed Nov. 12, 1938    2 Sheets-Sheet 1

INVENTOR.
John H. Neu
BY Rasmussen and Brugman
ATTORNEYS.

March 26, 1940.  J. H. NEU  2,194,670
SALES TICKET
Filed Nov. 12, 1938  2 Sheets-Sheet 2
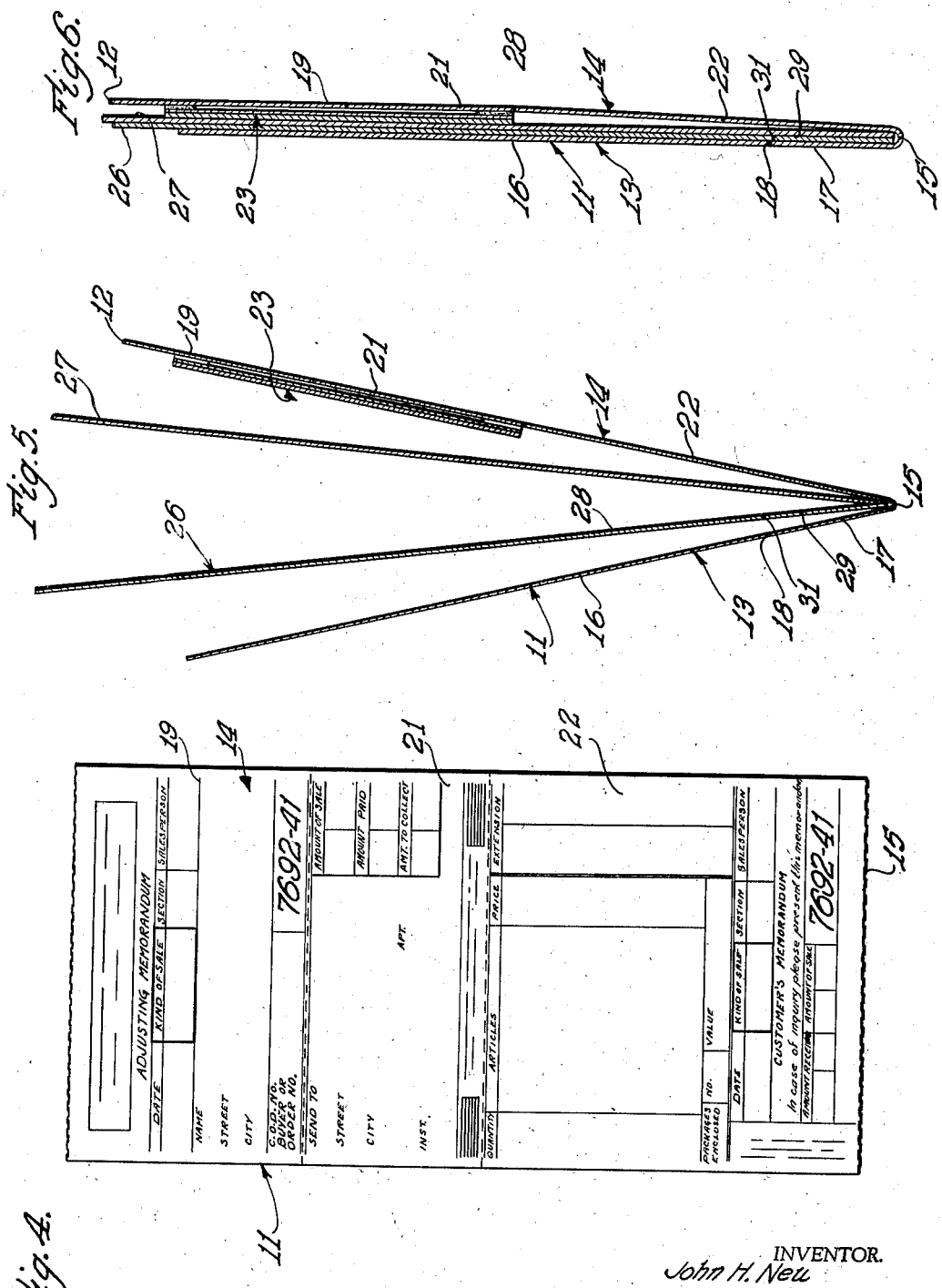
INVENTOR.
John H. Neu
BY Rasmussen and Brugman
ATTORNEYS.

Patented Mar. 26, 1940

2,194,670

UNITED STATES PATENT OFFICE 2,194,670

SALES TICKET

John H. Neu, Chicago, Ill.

Application November 12, 1938, Serial No. 240,097

2 Claims. (Cl. 282—27)

This invention relates in general to sales books and more particularly to a packing and delivery ticket which is removably secured to a shipping label along its marginal edges and having a carbonized back surface by means of which an impression or writing can be inscribed upon the face of the shipping label to which it is attached. This application is a continuation in part of my prior copending application, Serial No. 105,866, filed October 16, 1936.

An important object of the invention is the provision of a packing and delivery ticket which is easily attached to the sales check now in ordinary use and which remains in position during the writing of the sales ticket. Said ticket is easily detached therefrom and provides an additional ticket for packing, delivery, adjusting and other forms of records of users of this type of sales book.

Another important object of the invention is the provision of a packing and delivery ticket which is removably secured to the face of a sales check and remains in perfect alinement therewith during the operation of making out the sales check and provides for an additional number of recordings of a sale than what has been the practice heretofore.

Another important object of the invention is the provision of a packing and delivery ticket having a carbonized back surface and means for removably securing the same in its proper relation to a sales check and at the same time permitting the sales person to pay no further attention to it and at the same time making a plurality of recordings and tickets, which when separated, will provide additional records adapted to be distributed in the several departments to form a complete record of the transaction in an easy and simple manner. This has not been heretofore possible with the type of sales checks heretofore used.

Another important object of the invention is the provision of a sales ticket having a second sheet of lesser area removably secured to the upper face of the base portion in order that only certain of the desired information may be inscribed thereon which when removed from the base portion can be filed for further identification in the event that any inquiry is made by a customer relating to a specific transaction and also for compiling production and delivery records.

Numerous other objects and advantages of the invention will be apparent as it is better understood from the following description, which, when taken in connection with the accompanying drawings, discloses a preferred embodiment thereof.

In the drawings,

Figure 1 is a plan view of the face of a sales ticket;

Fig. 2 is a plan view of tissue sheet in detached form from the sales book;

Fig. 3 is a plan view of a packing and delivery ticket removably secured to a shipping label;

Fig. 4 is a plan view of the shipping label to which the packing and delivery ticket is removably secured;

Fig. 5 is a sectional view of the sales book in spread relation with each other;

Fig. 6 is a sectional view of the sales book, illustrated in Fig. 5, with the tickets in superimposed relation with each other.

Referring more particularly to the drawings, reference numeral 11 indicates in general a sales sheet. A plurality of the sheets 11 are preferably made up into a pad form and are bound or stapled adjacent the upper edge 12. The sheet 11 is composed of two parts 13 and 14 which are preferably secured together by means of a perforate line 15 and are folded upon themselves in such a manner as to have the part 13 folded over the part 14 with its free end at the top thereof. The part or portion 13, of the sheet 11, is divided into sections 16 and 17 by means of a perforate line 18. The section 16 forms a record for the auditing department of the purchase and of the individual to whom the merchandise is to be delivered (which in some instances is different than the purchaser). The section 17, when detached from the section 16 constitutes a customer's cash receipt when the merchandise is paid for in cash and delivery is requested.

The part 14 is divided into three sections 19, 21 and 22 by means of appropriate perforate lines inscribed thereon. The section 19 may be used as label for shipping purposes or filed for future use such as mailing lists if it is so desired. The section 21 may also be used as a label for parcel post and express purposes, while section 22 is used as a customer's memorandum to be enclosed with the merchandise sent to the customer.

Removably secured to the face of the part 14 is a packing and delivery ticket 23. The ticket 23 is separated into two sections 24 and 25 which provides a space for the name and address of the purchaser and a second space for the name to whom the merchandise is to be delivered. The ticket 23 has its upper and lower edges prepared with adhesive or gummed substance and the back of the ticket is covered with a duplicating surface such as carbon or the like. The gummed edges of the ticket 23 provide a means by which the ticket can be secured to the face of the portion 14 and is in effect a substantial duplicate of the sections 19 and 21. It will be apparent therefore that any inscription that might be inscribed on the ticket 23 will be further duplicated upon the sections 19 and 21 of the portion 14.

One of the uses of the ticket 23 is that after the merchandise has been sent to the shipping department and placed in a pre-determined route, the ticket 23 is detached from the section 19 and sent to the adjusting department so that proper information can be quickly given to the customer who might inquire as to the whereabouts of the purchase. The ticket 23 may be made in any desired length, width and form and may be removably secured to the portion 14 in any convenient manner which might suit the needs of the user. The ticket 23 is also adapted to be used as a means for compiling production statistics of the package wrapper since it is usually the custom for the package wrapper to initial the ticket 23 at the time the merchandise is wrapped for delivery.

Forming a part of the sales book is a sheet 26, preferably made of tissue or the like, which is made up into pads and secured together at the top by means of staples or the like. A sheet of double-faced carbon paper 27 is also securely fastened in the pad at the top thereof and is interposed between the tissue sheet 26, packing and delivery ticket 23 and the sheet 14, when they are in folded relation with each other. In practice, it is common to provide two pads which are inter-folded with each other, one of the pads comprising a plurality of the sheets 11 which are composed of the portions 13 and 14. The packing and delivery ticket 23 is secured to the sheet 14 and the carbon sheet 27 is interposed between the sheet 14, ticket 23 and the tissue sheet 26. The tissue sheet 26 is placed between the carbon sheet 27 and the front portion 13 and any indicia which is then inscribed upon the face of the sheet 13 will be impressed in a reverse direction upon the tissue sheet 26 from the carbon sheet 27. The carbon sheet 27 in return leaves an impression upon the ticket 23 and the lower end of the portion 14 of all indicia which are made upon the face of the section 13.

In this manner a complete and sufficient record of the transaction is maintained for distribution throughout the several auditing, shipping, adjusting, packing and sales departments. The tissue sheet 26 is divided into two sections 28 and 29 which are severable by means of perforate line, or the like 31. In actual practice these sheets are retained or held by the sales person, usually until the end of the day, when they are detached at their tops. The section 28 is sent to the auditing department while the section 29 is retained by the sales person, thus enabling the sales person to retain a record of all the sales which have been made during the course of each day. It will thus be apparent that a complete record of the transaction is made for all necessary departments, also including a record for the customer.

The sales book is packed by folding the section 11 over the tissue sheet 26 with the double-faced carbon paper 27 interposed between the sections 14 and 23 and a complete record is inscribed by the sales person upon the face of the section 13. The address, quantities purchased and the like, are recorded and inscribed thereon and the impression thereof is carried through onto the tissue sheet 26, the packing and delivery ticket 23 and on the face of the section 14. These several tickets are then distributed to the several departments and provide a complete written record of the transaction as made by the sales person with the customer. There is no need for any subsequent writing to be done or entries made and hence eliminates a possibility of an error which sometimes results when an individual other than the original writer attempts to transcribe notations made by someone else.

The ordinary form of sales books can be utilized with my invention for making a sufficient number of records of each sale in order that all departments which are necessary for the conduct of a large retail merchandising business be supplied with the essential records of information for their own sales records and also to provide means for shipping and packing records, as well as for the tracing of each individual purchase, as the necessity arises.

It is apparent that the use of this sales ticket is one of the very important steps in recording the delivery of merchandise. It enables the adjusting department of the store to determine very quickly and with the least amount of effort the approximate location of any package which is enroute to a particular purchaser. It also facilitates the tracing of a package if, as sometimes happens, for some reason the package has failed to reach its destination, or in the event the customer wishes to duplicate the original order by means of telephone or other means of communication.

The delivery systems in a large department store in any large metropolitan area present a multitude of problems. Thousands of packages are handled daily and they must be handled speedily and accurately with as small amount of effort as possible. The sales ticket 11 is made out by the sales person at the time the purchase is made and comprises a complete unit. The upper parts 19 and 21 of the sheet 14 and the ticket 23 which is removably secured thereto are pasted or attached to the outside of all delivery packages by the inspector or package wrapper, and the package is then dropped into a chute at the store.

The packages are then delivered in trucks to a centrally located garage and thereafter sorted according to the location of the delivery point of the package with the base ticket 14 firmly affixed to the package and the ticket 23 removably secured thereto. The ticket 23 is then removed from the portion 19 of the ticket 14 and is returned from the garage to the adjusting department at the store which is an indication that the package has been placed upon the truck for final delivery to the customer. It is an easy task to quickly remove the section 23, which is pasted along its marginal edges to the base sheet 19 without mutilation of either of the tickets, so that their identity is retained, and at the same time they are firmly enough secured together to prevent accidental removal or mutilation. As soon as the ticket 23 has been removed from the base portion 19 it is returned to the adjusting department and indicates that the package has been placed on the truck for delivery and in the event any inquiry is made relating to the purchase, the customer can be quickly informed as to the approximate location of the package, and the operator, knowing the route of each truck, can quite accurately advise the customer as to when delivery may be expected. This is all a very important consideration in the handling of thousands of packages in the daily operation of a large department store and in the receiving of hundreds of inquiries relating to said deliveries.

Heretofore as each package was received at the garage it was recorded upon another sheet known as a retail charge and cash garage trip sheet. No effort was ever made to list the names alphabetically but the checker would merely write in the street address and the first letter in the surname of the customer. Thus when an inquiry was made regarding a certain purchase a great deal of unnecessary time was expended in locating the package by means of the above described trip sheet and informing the customer. When the tickets 23 are detached from the packages and sent to the adjustment department, they are filed alphabetically by the customer's name and district and not according to the order in which the package was placed on the truck and when an inquiry is made about a certain purchase, the customer's name and address in full and the whereabouts of the same is easily ascertained. In addition to expediting delivery by eliminating trip sheet writers, more accurate records are available.

The reason for having the tickets 23 smaller in area is that only the necessary information need be contained therein which is necessary to identify the particular purchase that has been made and which is necessary to identify the particular purchase that has been made and which has been inquired about by the customer. It is of course to be understood that the tickets 23 may be of any size and have inscribed on the surface thereof any indicia of writing areas that might be thought necessary to readily identify a specific purchase.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sales ticket comprising a single sheet foldable intermediate its length and severable into a top portion and a base portion and having indicia and writing areas inscribed on the upper surface of said top and base portions, a smaller second sheet removably secured to the upper face of said base portion, said second sheet having a carbonized back surface and also certain indicia and writing areas inscribed on its face which are adapted to register with only certain of the indicia and writing areas on said base portion when the two are in superposed relation, said second sheet being removably secured to said base portion at a plurality of places along two of its marginal edges thereof and is adapted to be readily removed from said base portion for filing for further identification in the event an inquiry is made regarding a specific transaction.

2. A sales book comprising a single sheet foldable intermediate its length and severable into a top portion and a base portion and having indicia and writing areas inscribed on the upper surfaces of said top and base portions, a smaller second sheet removably secured along two of its edges to the upper face of said base portion, said second sheet having a carbonized back surface and also certain indicia and writing areas inscribed on its face which are adapted to register with only certain of the indicia and writing areas on said base portion when the two are in superposed relation, and a tissue sheet and a double-faced carbonized sheet inserted between said upper portion and said second sheet, said second sheet being adapted to be readily removed from said base portion for filing for further identification in the event an inquiry is made regarding a specific transaction.

JOHN H. NEU.